(12) United States Patent
Guenkova-Luy et al.

(10) Patent No.: US 9,894,463 B2
(45) Date of Patent: Feb. 13, 2018

(54) MANAGING OPERATION OF A TELEMATIC SYSTEM

(71) Applicant: Harman Becker Automotive Systems GmbH, Karlsbad (DE)

(72) Inventors: Teodora Guenkova-Luy, Ulm (DE); Martin Clauss, Ummendorf (DE); Oliver Abt, Blaustein (DE)

(73) Assignee: Harman Becker Automotive systems GmbH, Karlsbad (DE)

(\*) Notice: Subject to any disclaimer, the term of this patent is extended or adjusted under 35 U.S.C. 154(b) by 58 days.

(21) Appl. No.: 13/787,824

(22) Filed: Mar. 7, 2013

(65) Prior Publication Data

US 2013/0237209 A1 Sep. 12, 2013

(30) Foreign Application Priority Data

Mar. 7, 2012 (EP) .................................. 12001539

(51) Int. Cl.
*H04M 3/00* (2006.01)
*H04W 4/00* (2009.01)
(Continued)

(52) U.S. Cl.
CPC ......... *H04W 4/003* (2013.01); *H04L 12/5692* (2013.01); *H04L 67/12* (2013.01); *H04L 67/32* (2013.01)

(58) Field of Classification Search
CPC .......... H04M 1/72533; H04M 11/0074; H01L 29/08567
(Continued)

(56) References Cited

U.S. PATENT DOCUMENTS

2005/0049021 A1  3/2005 Nedelcu et al.
2007/0217349 A1\* 9/2007 Fodor ................. H04L 12/5692
                                                    370/310.2
(Continued)

FOREIGN PATENT DOCUMENTS

EP    2159974        3/2010
EP    2575301 A1     9/2011
(Continued)

OTHER PUBLICATIONS

European Search Report dated Aug. 3, 2012, European Patent Application No. EP 12 00 1539.1.
(Continued)

*Primary Examiner* — Timothy Pham
(74) *Attorney, Agent, or Firm* — McCoy Russell LLP (57) ABSTRACT

A terminal system may be connected to a communication network and multiple network access devices (NADs). The terminal system may include a computer system and a database. The computer system may read information from the database regarding associations between the NADs and media and applications to be run on the computer system and/or the NADs. Based on the read information the computer system can control access of: a) at least one of the NADs to a media and/or b) at least one of the applications to a media and/or c) at least one of the applications to at least one of the NADs. The information can include provider rules for associations between providers and NADs for providers providing services via the communication network and/or constraints on associations between NADs and applications.

20 Claims, 8 Drawing Sheets

(51) Int. Cl.
*H04L 12/54* (2013.01)
*H04L 29/08* (2006.01)

(58) Field of Classification Search
USPC .......................................... 455/420
See application file for complete search history.

(56) References Cited

U.S. PATENT DOCUMENTS

2007/0255797 A1 11/2007 Dunn et al.
2011/0199962 A1 8/2011 Kahn et al.
2014/0038669 A1* 2/2014 Shimizu ................. H04L 67/12
                                                          455/556.1

FOREIGN PATENT DOCUMENTS

| JP | 2003338856 A | 11/2003 |
| WO | WO 2005/062652 A1 | 7/2005 |
| WO | 2008020536 A1 | 2/2008 |
| WO | 2010141437 A2 | 12/2010 |

OTHER PUBLICATIONS

European Patent Office, Office Action in Application No. 12001539.1, Feb. 6, 2017, Netherlands, 9 pages.

* cited by examiner

| Rule# | Voice-Media | Data-Media |
|---|---|---|
| 1 | (Prov1, Dev1) | (Prov1, Dev1) |
| 2 | (Prov2, Dev3) | (Prov1, Dev2) |
| 3 | (Prov2, Dev3) | (Prov2, Dev3) |
| 4 | (Prov2, Dev4) | (Prov2, Dev4) |
| 5 | (Prov2, Dev4) | (Prov2, Dev3) |
| 6 | (Prov2, Dev3) | (Prov2, Dev4) |

FIG. 3

| Application | Voice-Media | Data-Media |
|---|---|---|
| Appl_1 | | Dev1 |
| Appl_1 | | Dev2 |
| Appl_1 | | Dev3 |
| Appl_1 | | Dev4 |
| Appl_2 | Dev1 | Dev1 |
| Appl_2 | Dev3 | Dev2 |
| Appl_2 | Dev3 | Dev3 |
| Appl_2 | Dev4 | Dev4 |
| Appl_2 | Dev4 | Dev3 |
| Appl_2 | Dev3 | Dev4 |

FIG. 4

| Application | Voice-Media | Data-Media |
|---|---|---|
| Appl_2 | Dev1 | Dev1 |
| ~~Appl_2~~ | ~~Dev3~~ | ~~Dev2~~ |
| ~~Appl_2~~ | ~~Dev3~~ | ~~Dev3~~ |
| Appl_2 | Dev4 | Dev4 |
| ~~Appl_2~~ | ~~Dev4~~ | ~~Dev3~~ |
| ~~Appl_2~~ | ~~Dev3~~ | ~~Dev4~~ |

FIG. 5

| Application | Voice-Media | Data-Media |
|---|---|---|
| ~~Appl_2~~ | ~~Dev1~~ | ~~Dev1~~ |
| ~~Appl_2~~ | ~~Dev3~~ | ~~Dev2~~ |
| *Appl_2* | *Dev3* | *Dev3* |
| ~~Appl_2~~ | ~~Dev4~~ | ~~Dev4~~ |
| Appl_2 | Dev4 | Dev3 |
| ~~Appl_2~~ | ~~Dev3~~ | ~~Dev4~~ |

FIG. 6

| Application | Voice-Media | Data-Media |
|---|---|---|
| ~~Appl_2~~ | ~~Dev1~~ | ~~Dev1~~ |
| ~~Appl_2~~ | ~~Dev3~~ | ~~Dev2~~ |
| ~~Appl_2~~ | Dev3 | ~~Dev3~~ |
| ~~Appl_2~~ | ~~Dev4~~ | ~~Dev4~~ |
| *Appl_2* | Dev4 | *Dev3* |
| ~~Appl_2~~ | ~~Dev3~~ | ~~Dev4~~ |

MANAGING OPERATION OF A TELEMATIC SYSTEM

1. PRIORITY CLAIM

This application claims the benefit of priority from European Patent Application No. EP12001539.1, filed Mar. 7, 2012, which is incorporated by reference.

2. TECHNICAL FIELD

The present invention relates to telematic systems, in particular, vehicular telematic systems, in which network access devices can be provided for a variety of applications making use of one or more media.

3. RELATED ART

Telecommunication mobile services have become ubiquitously available in various environments. The general application of such services is indicated as telematics, which means the integrated application of telecommunications and informatics, whereby technologies for sending, receiving and storing information via telecommunication devices are put into operation for realization, for example, of home and business applications. For example, in the automotive environment vehicular infotainment and telematics are offered via multiple devices both installed in the vehicle and mobile devices carried by a user and possibly connected to a vehicle communication system, for instance terminal devices like Personal Digital Assistants and mobile phones.

SUMMARY

A telematics system can include a terminal system connected to a communication network. The communication network can include multiple network access devices (NADs). The terminal system can include a computer system. The terminal system can read information regarding associations between the NADs and media and applications, such as telematics applications, to be run on the computer system and/or the NADs. In addition, based on the read information, the terminal system can: control access of at least one of the NADs to a media and/or control access of at least one of the applications to a media and/or control access of at least one of the applications to at least one of the NADs.

The information read by the terminal system can include provider rules (or constraints) for associations between providers and NADs, for providers providing services via the communication network. Alternatively, or in addition, the information can include constraints on associations between NADs and applications. The communication network may include any wide-area network such as a Universal Mobile Telecommunications System (UMTS) network and/or a Global System for Mobile (GSM) Communications network, or any other communication system or platform. In addition, the NADs may be connected to the Internet under the control of the terminal system.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

In order to apply different devices of a telematic system according to their individual capabilities, customer requirements and/or provider restrictions, specific rules can be defined in order to have the system decide which device is to be chosen for what kind of application media under what circumstances. For example, Quality of Service (QoS) strategies can be implemented that allow management of terminal equipment, such as end-to-end management of some terminal equipment. Some example strategies can treat terminal equipment in a telematics system as a single network access device. Alternatively, strategies may be implemented to individually manage the usage of multiple telematic devices of specific terminal equipment that may belong to one and the same, or different, provider systems.

A terminal system may be implemented in a computer system installed in a vehicle, for example, an automobile. In this case, the terminal system may be part of, or include, an in-vehicle communication system. The terminal system may operate as a terminal control system to, for example, enable the possibility of cooperatively operating multiple network access devices (NADs). Such cooperatively operating NADs can be applied as a "single modem" for media communication from the point of view of applications executing, for example, in the vehicle. Since the cooperative operating NADs are applied as a "single modem," effective bandwidth for applications running media over the NADs may be increased, and media that includes voice and packet-based (non-voice) data parallelism may be enabled for applications associated with data and/or voice contents. In addition, the bundling of the connectivity capabilities of the NADs may serve the requirements of multiple users utilizing the same vehicle computing resources.

In GSM-Networks media may include voice data and non-voice packet-based data, such as data for any IP-transport purposes. In general, the packet-based data can be considered as different media types in consideration of which coding mechanisms are applied to the media. For example, Hypertext Transfer Protocol (HTTP) may be used for any text and non-streaming data, or Real-Time Protocol (RTP) may be used for streaming data such as music or video, or the like. Typical applications include telephony, Internet browsing/uploading/downloading, mailing, navigation, or any other single or multimedia application. Terminal devices, such as mobile phones, mobile computers and Personal Digital Assistants are representative examples of the NADs.

In order to efficiently manage operation of the terminal system association between the NADs, the media, and applications can be established. By the term "association" it is meant assignment of or mapping between individual NADs and applications to be run on the NADs, and the respective media used by an application. The terminal system can read information that allows for assigning a particular one or more of the NADs to some particular application and/or media. The terminal system can generate for each of a number of different applications (and the associated media) a list of potentially operable NADs. The information can include particular constraints that, in principle, can be provided by a manufacturer, a user and/or a provider of a service carried on the communication network. At least part of the information may be stored in a database of the terminal system. The information may also, or alternatively, include a prioritization scheme of associations between the NADs, the media, and/or the applications. For example, if more than one NAD is suitable for a particular application and/or media, each of the suitable NADs can be given a priority value such that in the case that all or some of the suitable NADs is actually available for the application/media, the available NAD with the highest priority can be selected.

The terminal system is not treated as one single user/entity without differentiation between the individual NADs included in the terminal system. Rather, unique associations between individual NADs, particular applications, and the media being used may be established to thereby achieving efficient operation when communicating via the communication network, substantially without disturbances or interruptions during the operation of applications.

Since the terminal system can be connected to a communication network, the information used by the terminal system can include information related to Service Level Agreements for the applications. Service Level Agreements (SLAs) can be provided, for example, by providers providing telecommunication services. The SLAs may, for example, define restrictions for the execution of applications within a scope predefined by the provider. In an example, SLAs may be assigned to applications and may define whether an application is allowed by a particular provider. The terminal system may extract information from the database in order to understand and make use of the SLAs. In addition, constraints with respect to the associations of NADs with providers can be taken into account by the terminal system. Thus, particular applications and NADs can be associated with each other by the terminal system based on the SLAs and such constraints.

In addition, to static associations, dynamic media/application/NADs associations, such as particular associations that can be changed over time and/or in accordance with system conditions can also be included and implemented within the terminal system. The terminal system can, for example, run a particular application on a particular one of the NADs and control association of the particular NAD with applications such that the NAD is only associated with another application different from the particular application, if either execution of the particular application is completed or another application of higher priority than the particular application is to use the particular NAD. Thereby, the system can maintain an actually running application without substantial interruption if the NAD used by the running application is available and no other higher priority application requests for use of that NAD.

The terminal system may also enable a particular application to run on a particular one of the NADs from a list of operable NADs, as mentioned above, when another NAD of the list is not available. In addition, the terminal system can allow for association of the particular application with the another NAD included in the list after the another NAD becomes available when media accessed by the particular one of the NADs included in the list used in the particular application is not active. In other words, the application can be changed to use the NAD that becomes available after the start of the application on another NAD when no interruption of the media would result from such a change.

Furthermore, the terminal system can run a first application on a first NAD using a first media and subsequently start a second application on one or more NADs using one or more media, Starting the second application can include re-associating the first NAD and the first application and/or the first media such that the first application at least partly continues running on a second NAD and/or the first NAD continues running the first application using a second media of the first application. In accordance with the available resources, some re-association may, thus, be performed dynamically by the terminal system.

According to another example, the terminal system can run a first application on a first NAD using a first media and subsequently the terminal system can direct the first application to start using a second media on a NAD that is not already running an application using the second media. Interruption of media is avoided thereby, even if a second media is necessary for the first application after starting running of the first application.

According to another example, the terminal system may run an application on a first NAD connected to the communication network and subsequently change connection of the communication network to a second NAD and continuing running the application on the second NAD. Thus, is the terminal system can not only control which one of the multiple NADs connects to and uses the communication network for a particular application, but also the terminal system can react to changes in the connection from the communication network to the NAD. Examples of changes in the connection include cases of network signal changes, handovers or re-attachments to the infrastructure.

Consider, for example, the terminal system being part of a vehicle communication system, such as an automotive communication system installed in a vehicle. During travel of the automobile it may happen that a high quality WLAN network becomes available (due to entry into a WLAN hotspot, for instance). In such a case, the computer system of the terminal system may switch connection of at least one of the NADs from a first network, such as a UMTS network, for example, to a second network, such as the WLAN network. Thus, both signal quality of the individual NADs and communication network quality of different available communication networks can be taken into account by the terminal system when controlling the transfer of data between the communication network and the NADs.

The terminal system may also include a computer program product, comprising one or more computer readable storage media having computer-executable instructions for performing operations of the terminal system, such as one or more of the above-described example operations. The terminal system may also be configured for connection to a communication network, and multiple network access devices (NADs) configured to run applications using media.

The telematics system may also include a computer system configured to control associations between the NADs and the applications and the media based on predetermined information. The predetermined information can include a) provider rules for associations between providers and NADs for providers providing services via the communication network and/or b) constraints on associations between NADs and applications. The computer system can control access based on the read information. Control of access may include controlling the access of a) at least one of the NADs to a media and/or b) at least one of the applications to a media and/or c) at least one of the applications to at least one of the NADs.

The terminal system may include a database configured for storing at least part of the information, and the computer system can read the at least part of the information from the database. In particular, the terminal system can be an automotive terminal system installed in a vehicle, for example, an automobile.

Figure 1:
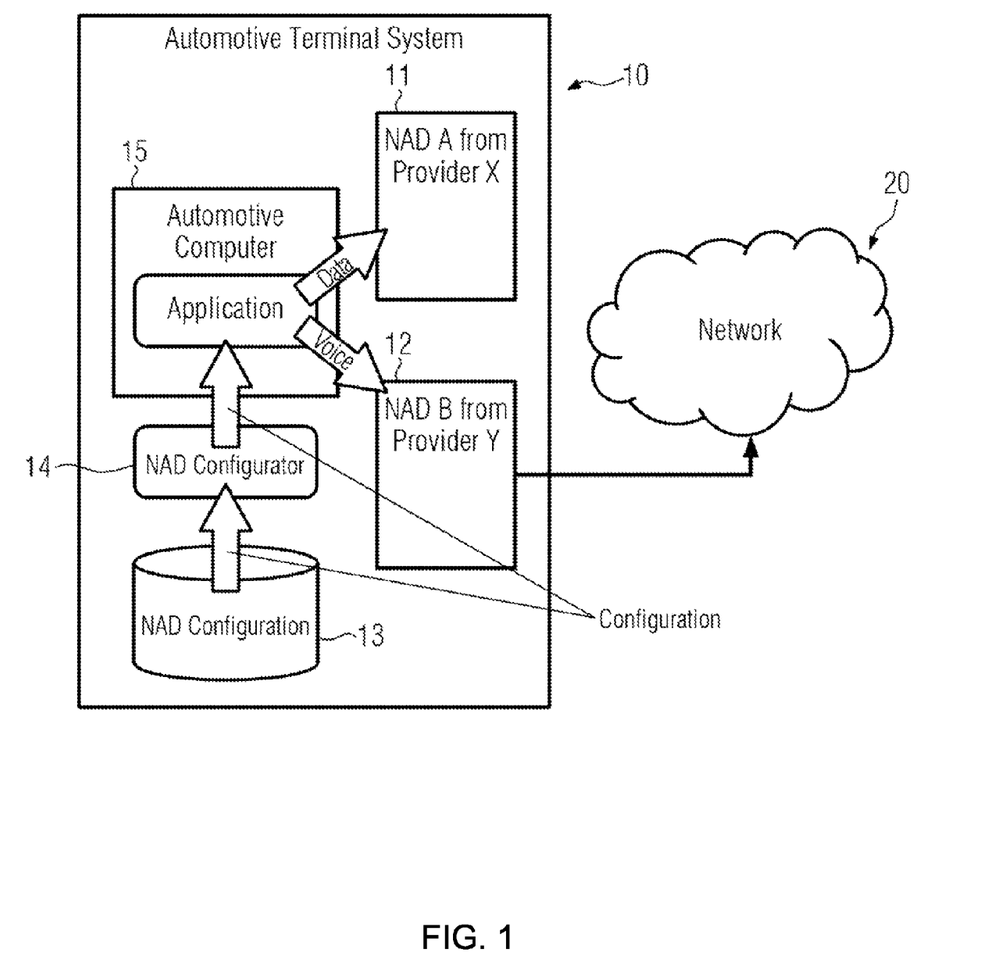
FIG. 1 illustrates a block diagram of an example of a terminal system and a network.

FIG. 1 is an example of a terminal system 10 communicating with a communication network 20. The terminal system 10 of this example can be included in a vehicle such as an automobile, or any other mobile conveyance or device. The communication network 20 may be any wireless high-mobility wide-area network or combination of such wireless networks. The communication network 20 may include but is not limited to technologies such as a Wireless Local Area Network (WLAN) and/or a General Packet Radios Service (GPRS) network and/or a Global System for Mobile Communications (GSM) network and/or a Universal Mobile Telecommunications System (UMTS) and/or Long-Term-Evolution (LTE) network. The mentioned example technologies belong to IEEE (Institute of Electrical and Electronics Engineers) or 3GPP (3rd Generation Partnership Project) standardization efforts, however, in other examples, any other standards based communication systems, or proprietary communications systems may be used.

The data exchanged via the communication network 20 can be, for example IP-data, that can be static data, such as text, images, non-voice data and the like, dynamic data, such as voice, video, or other streaming or variable data, or any digitally coded static or dynamic data like GSM-voice or SMS-text, in accordance with coding and protocols for the corresponding information types. As used herein, the term "media" is defined to include data used in connection with applications, that is capable of transmission as communicated data over a network.

The terminal system 10 may communicate with network access devices 11 and 12. The network access devices (NADs) 11 and 12 may belong to, or communicate within, different communication provider systems, and may operate as terminal equipment such as a mobile computer, mobile phone or built-in telephone. In general, the terminal system may manage data and voice traffic on different NADs included in such terminal equipment. The terminal system 10, may also include a database 13 storing data that includes rules determining how different media are associated with NADs in view of the kind of application. Database 13 may store information such as rules regarding provider restrictions and customer/provider prioritization schemes.

The terminal system 10 may also include an NAD configurator unit 14. The configurator unit 14 may, for example, be part of any computer system included in, or operable with, the terminal system 10. The NAD configurator unit 14 can include decision logic, which may include software, used for the applications. The decision logic can be executed to indicate under what conditions each NAD can be applied in view of the media being processed. The term "unit" is defined to include one or more executable modules, at least some of which may be embodied in a computer readable storage medium as executable instructions. Accordingly, as described herein, the units are defined to be hardware executable by the processor, such as a computer readable storage medium that may include instructions executable by the processor, a field programmable gate array (FPGA), and/or various devices, components, circuits, gates, circuit boards, and the like that are executable, directed, and/or controlled for performance by a processor.

Figure 2:
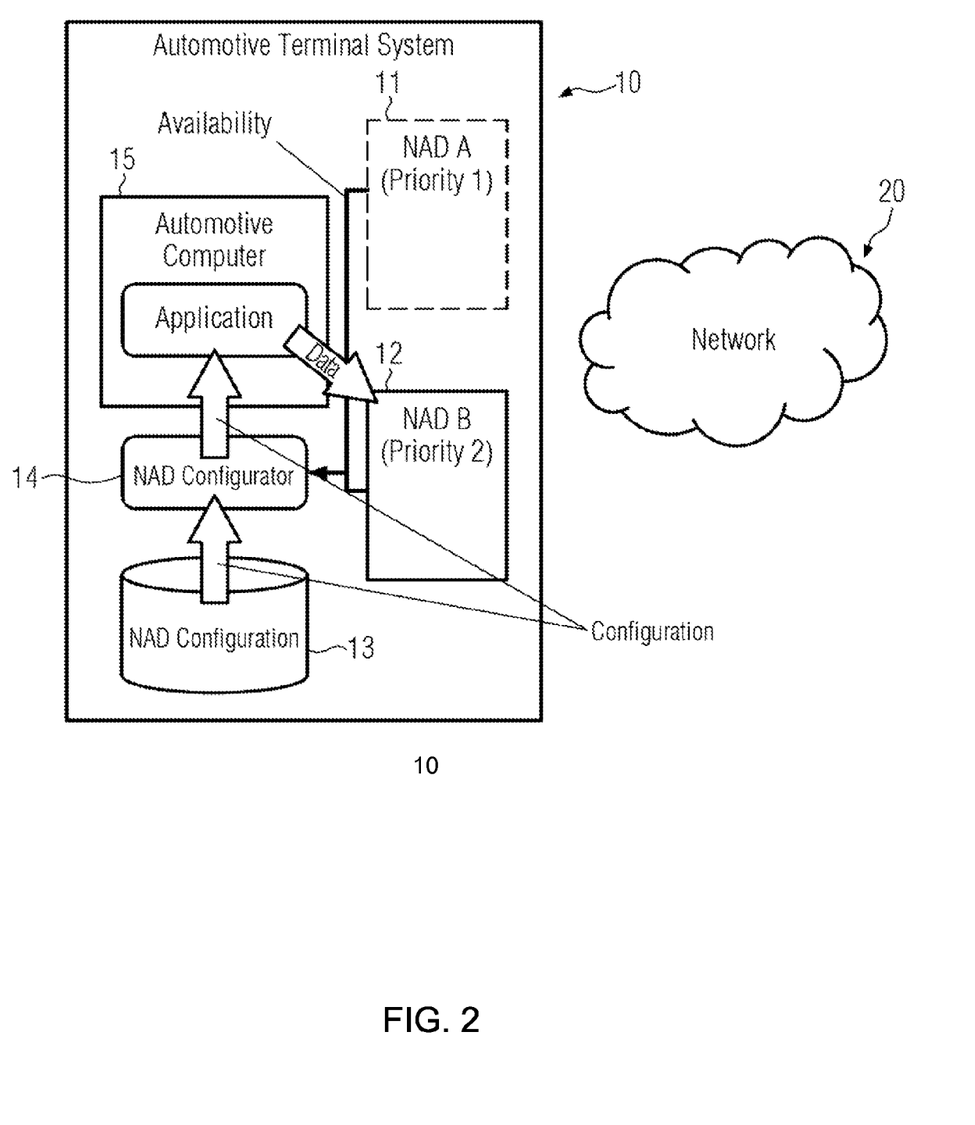
FIG. 2 illustrates a block diagram of another example of a terminal system and a network.

In addition, the terminal system 10 can include a computer system 15 for running applications. The NAD configurator unit 14 may be implemented on the same computer system 15 or a different computer system. The computer system 15 can be an automotive computer, as illustrated in the examples of FIGS. 1 and 2, however, in other examples any other form of computer system may be used. The terminal system 10 and/or the computer system 15 include a processor. The processor may be one or more one or more general processors, digital signal processors, application specific integrated circuits, field programmable gate arrays, digital circuits, analog circuits, combinations thereof, and/or other now known or later developed devices for analyzing and processing data.

The terminal system, and/or the computer system 15 may also include memory. The memory may include a main memory, a static memory, and/or a dynamic memory. The memory may include, but is not limited to computer readable storage media, or machine readable media, such as various types of non-transitory volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory includes a cache or random access memory for the processor. In addition or alternatively, the memory may be separate from the processor, such as a separate cache memory of a processor, the system memory, or other memory. The memory may also include (or be) an external storage device or database for storing data. Examples include a hard drive, compact disc ("CD"), digital video disc ("DVD"), memory card, memory stick, floppy disc, universal serial bus ("USB") memory device, or any other device operative to store data. The memory is operable to store data and instructions executable by the processor. The functions, acts or tasks illustrated in the figures or described may be performed by or in connection with the programmed processor executing the instructions stored in the memory. The functions, acts or tasks may be independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

The NAD configuration database 13 can be located on a different computer of the automotive terminal system 10 as compared to the automotive computer 15 and/or the same computer whereon the NAD configurator unit 14 is implemented. The NAD configuration database 13 can be stored in memory.

In the example shown in FIG. 1, the NAD configuration database 13 can be used by the NAD configurator unit 14 to provide rule management of the NADs 11 and 12. The NAD configurator unit 14 can enable independent communication of the NADs 11 and 12 with the communication network 20 based on one or more explicit rules related to the media being processed. For example, an explicit rule can indicate that application data, such as non-voiced data and/or packet-based data, and voice data shall be associated with different devices. Thus, in this example a specific rule may provide that non-voiced data can be associated with NAD 11 and voice data can be associated with NAD 12. Such a rule, for example, implies that an application for processing the media may not be available to run, if one of the NADs 11 and 12 is not operable.

FIG. 2 shows another example of the terminal system 10 system that is similar to that shown in FIG. 1. However, in this example an explicit rule governing the order (priority) of NADs 11 and 12 is implemented. In general, in this example the terminal system 10 may manage data where two or more NADs are, in principle, capable of being used in connection with the same application. In FIG. 2, if the two NADs 11 and 12 provide comparable capabilities the NAD configurator 14 may use information regarding the prioritization of the NAD devices 11 and 12 when both are capable of operation in connection with an application. In an example, NAD 11 is not available, as illustrated by the dotted lines in FIG. 2, and, thus, the second device NAD 12 is chosen and enabled by the NAD configurator 14 to process a particular media, such as a stream of media. Although in FIGS. 1 and 2 an automotive terminal system 10 and automotive computer 15 are shown, in principle, any terminal system and computer system configured for network communication, can be used.

Explicit rules for managing the usage of NADs for different media and applications may be based on configuration groups that describe pairings of types of providers and physical devices. The physical devices may indicate system (virtual) slots, for example, USB slots, where NADs might be coupled to the automotive terminal system 10. The user of the terminal system 10 shown in FIGS. 1 and 2 may indicate a predefined, default order of selection of NADs for execution of an online application for the case where no other customized explicit rule is available. Provider indication in configuration groups can include the pairings of types of providers and physical devices so that devices of the same provider type might have the same or similar configuration for accessing network and/or system resources. In addition, media types of the same application can be associated with different devices, for example the media types can assume configurations of different providers.

Figure 3:
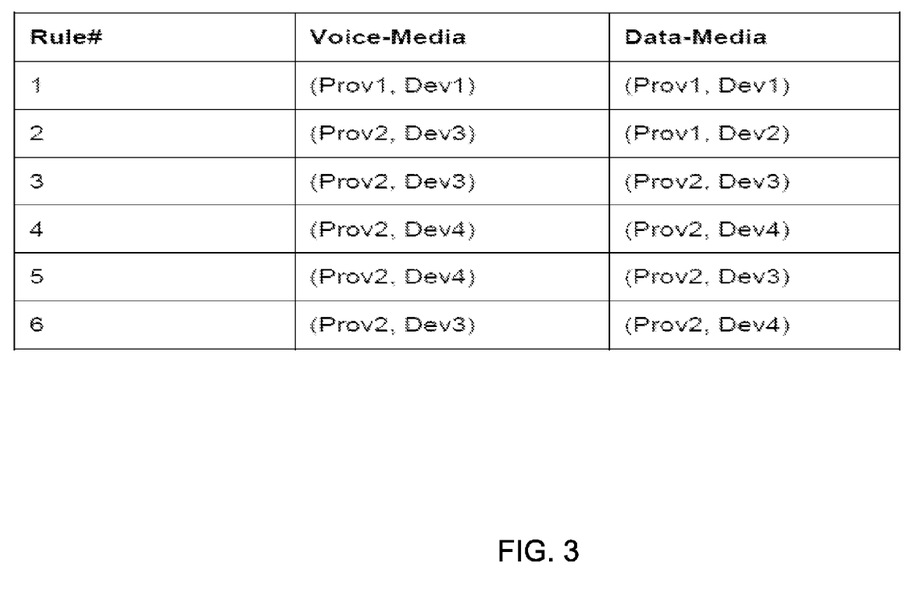
FIG. 3 illustrates an example of provider-device association constraints.

In FIG. 3 an example table of provider-device association constraints are shown. In the example of FIG. 3, it is assumed that a particular NAD, such as Dev2, is not capable of executing applications using certain media, such as when the media is voice. In FIG. 3, according to Rule 1 another NAD, Dev1, of provider type 1 is chosen to execute an application when the media of the application is voice, if Dev1 is available. If Dev1 is not available, according to Rule 2 in FIG. 3, another NAD, Dev3, of provider type 2 is used for voice-media and Dev2 of provider type 1 is used for (non-voiced) data-media. In this case, the application and the NAD configurator 14 shown in FIGS. 1 and 2 are aware of the fact that voice media and data media have to be configured for network and service usage with configurations belonging to different provider types (Prov2 and Prov1).

Rows 3 and 4 of the example of FIG. 3 describe the rules for using devices with equivalent capabilities of the same provider type, such as provider2. In this example, according to Rule 3, as soon as one of the devices (NAD, Dev3) is selected for one of the media (such as for data), the other media type of the application may run on the same device (such as the voice enabled device). The order of the rules in the table can also be used for prioritizing of the executable use-cases for the purpose of being able to meet certain unique choice of devices for the application, such as when all devices are available and all use-cases are possible. Prioritization can also be defined explicitly by, for example, the numbering of the rules.

An example of possible prioritization of the applicable use-cases can also be illustrated by rows 3 and 4 of the table of FIG. 3. The entries of rows 3 and 4 can also be interpreted as follows "Take Dev3 first if both devices Dev3 and Dev4 are available". The combination examples of rows 5 and 6 define explicit rules for device coupling of devices Dev3 and Dev4 for example for cases where one of the media types is not used simultaneously with the other media type in a single NAD. In the example of Rules 5 and 6, different media types are allowed to run on different devices (NAD, Dev3 and Dev4). Here, the application is made aware by the rule of the usage of different devices for the application's media in order to apply provider configurations for the different devices upon which the application can be executed and corresponding media of the application processed. Note that in the case where Dev3 and Dev4 are exactly equivalent and not bound to any other constraints, ordering rules, the rule definitions from Rows 3 to 6 can be generated automatically as all possible variants of combinations. In one example, the criteria for sorting of the rules can be based on the numbering of the devices. In the example of FIG. 3, data and voice media is illustrated, however, the rules and operation of the system should not be restricted to only data and voice media.

In general, the provider type to Device, and provider type to Media associations may also include other media types. For example, IP-Data can be separated and declared as different types of media due to the performance of the different protocols executed over the IP Layer. In this respect different protocols can also be considered to be media types and may also be associated with different NADs. For example, a possible configuration can be: Hypertext Transfer Protocol (HTTP) shall execute on NAD X for non-streaming text data and Real-Time Transport Protocol (RTP) shall execute on NAD Y for streaming audio data.

In example implementations the management of individuals NADs of a terminal system can make use of contractual information, such as Service Level Agreements (SLAs) defining restrictions for applications to be executable within the scope of rights of a particular provider. The NAD configurator 14 shown in FIGS. 1 and 2 can be configured to interpret and understand contractual requirements, such as SLAs, for individual applications. In fact, the NAD configurator 14 may be configured to couple requirements, such as SLAs, and constraints stored in the NAD configuration database 13 shown in FIGS. 1 and 2 such that each application to be run by the terminal system 10 is uniquely configured for each of its media at any time of (intended) operation.

Figure 4:
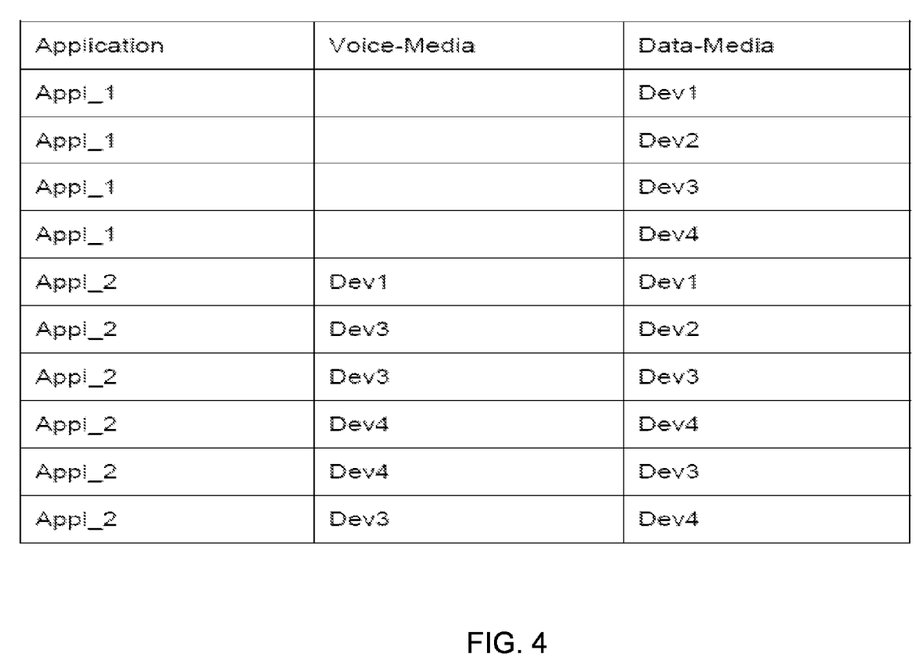
FIG. 4 illustrates an example of device-association for applications.

FIG. 4 is an example of constraints associated with applications and types of media. In FIG. 4, an example with two applications Appl_1 and Appl_2 is shown, wherein Appl_1 is a data-only application and Appl_2 is a voice and data application. The shown example is based on the provider/device restrictions illustrated in FIG. 3. In this example a possible static configuration of the system is shown under the assumption that all devices defined by the rules are available. Note that, in general, the number of rules, devices, applications and the media thereof is not restricted.

In order to provide fluent execution of the media, media migration to alternative devices can be included as an operational feature in the system. Migration of media to alternative devices is possible without interruption, for example, when the media is not active.

The example in FIG. 4 is described for Appl_2 when different dynamic conditions are applied and the media includes voice and data, thus, restricting the possible rule variants available for execution of the media. The provided solution is especially suitable for non-session aware and streaming media, where fall-back of the media state is difficult without interruption of the service. For example, in the case of dynamic data, such as video data, the fall back of the media state can cause jitter of the media due to dropping or rewinding of states. As a result, such a fall back may be perceived by the user as a media defect.

Figure 5:
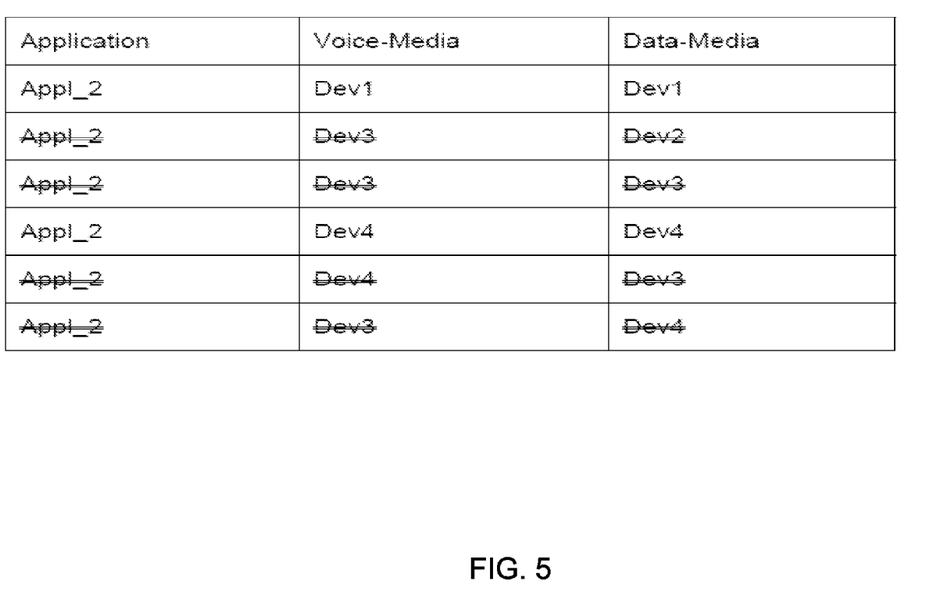
FIG. 5 illustrates an example of device-association for an application when a device is unavailable.

During operation, one or more of the predefined devices (NADs) may not be available for the particular application. In this case the number of possible use cases defined by the rules is restricted as shown in the example of FIG. 5 in which NAD Dev3 is indicated by strikethrough as being not available. Since NAD Dev3 is not available in this example, the crossed out rule variants in FIG. 5 are not possible, and if application2 makes a request for media, only the remaining two rule variants will be available.

Figure 6:
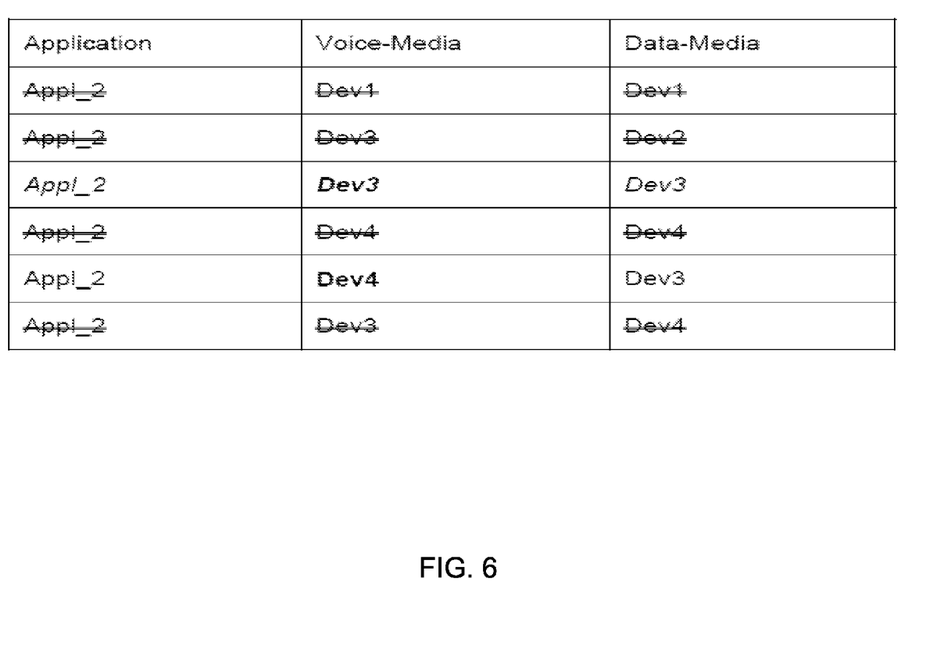
FIG. 6 illustrates an example of device-association for an application when multiple devices are unavailable.

In the example shown in FIG. 6, it is assumed that on start of receipt of data media NAD Dev1 and Dev2 were not available for application 2, so the media in the form of data started on Dev3. In such a case, two alternatives for media that is voice traffic of the application2 remain, namely, on Dev3 and on Dev4. The decision logic of the NAD configurator 14 can exclude those configurations of NADs which lead to re-switching of devices for the data. In FIG. 6, the currently active configuration is shown in italics. Alternatives for non-active media (such as media that is voice data) still exist and they are shown for voice data in bold in FIG. 6. If Dev1 or Dev2 were to be reactivated, Dev1 or Dev2 could be used in the processing when the media is not active. Inclusion of Dev1 and Dev2 in the processing can be implemented when the media is not active in order to avoid the media being interrupted.

Figure 7:
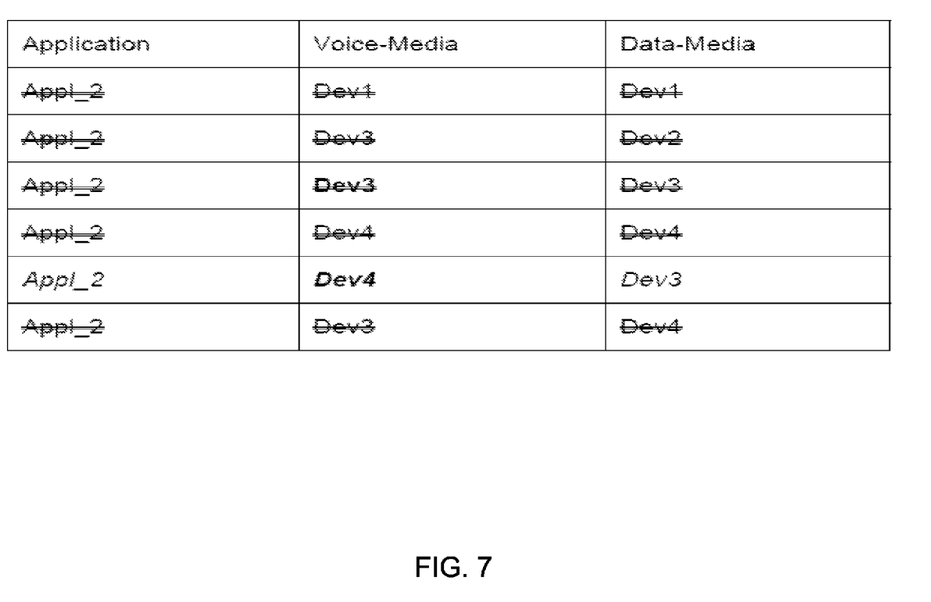
FIG. 7 illustrates another example of device-association for an application when capabilities of a device are unavailable.

FIG. 7 is an example for the case where a decision is made when a device (NAD) loses capability during an action session, thereby rendering rules no longer applicable. Similar to FIG. 6, in the example of FIG. 7, NAD Dev 1 and Dev2 are unavailable and thus rules involving these NADs are indicated by strike through in FIG. 7. In addition, in a situation in which the media is voice and data of application2, which is being processed by NAD Dev3 while NAD Dev1 and Dev2 are unavailable, during the active session, NAD Dev3 commences operation within a 2G Network where data and voice are not possible in parallel. The loss of the voice capability by NAD Dev3 may occur in a 3G to 2G handover between base stations, for example. Once NAD Dev3 operates within the 2G Network, the rule allowing NAD Dev3 to process media of both voice and data is no longer applicable and is illustrated in FIG. 7 with strike through. Since the rule allowing NAD Dev4 to process voice media remains in the table of FIG. 7, however, NAD Dev4 may process the voice media of application2 while NAD Dev3 processes the data media of application2 in accordance with the remaining rule. Accordingly, based on the remaining rule in the example table of FIG. 7 in a case where the voice media starts the application2's data and voice will be distributed on two different devices, namely NAD Dev3 and Dev4.

Figure 8:
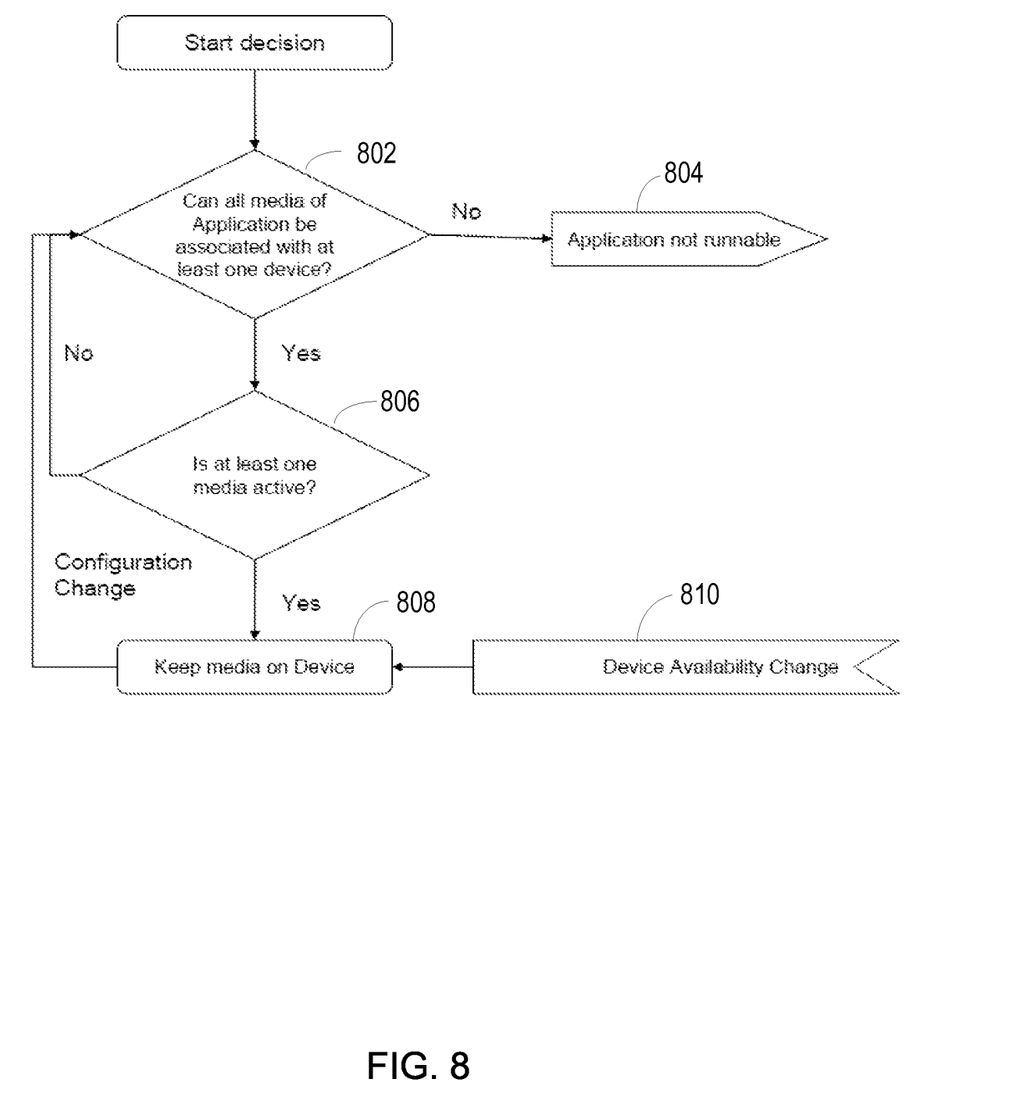
FIG. 8 illustrates an example of operation of the terminal system.

An example of operation of a media distribution algorithm included in the terminal system is illustrated in FIG. 8. The NAD configurator 14 operates as a decision engine to determine whether a media of an application is runnable on the associated devices (NADs) at block 802. If all the media of an application cannot be associated with at least one device based on constraints determined by the NAD configurator, at block 804 the application is terminated as not runnable. Thus, in an example case where some media part of the respective application has no device to be associated with, the application can be interrupted. Due to interruption of applications the resources of the system may be released so that the application may start again in an alternative configuration or remain non-executable.

If the media can be associated with at least one NAD at block 802, it is determined if the media is active at block 806. If the media is active, such as being streamed using the at least one NAD, the media is kept on the NAD at block 808. Block 810 represents a configuration change effecting availability of the associated NAD, at which time the operation may return to block 802 to determine if the media of the application can be associated with at least one NAD. The decision engine of the NAD configurator 14 can react dynamically per each application and its media on activation/deactivation of devices and/or media so that interruption of running media of applications is avoided as much as possible.

All previously discussed embodiments are not intended as limitations but instead serve as examples illustrating features and advantages of the invention. It is to be understood that some or all of the above described features can also be combined in different ways. Thus, while various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A computer-implemented method for controlling a terminal system connected to a communication network comprising multiple network access devices (NADs) as terminal devices, the method comprising:

reading information with a computer system, the information describing associations between the NADs, media including voice data and non-voice packet-based data, and applications run on at least one of the computer system or the NADs, the information comprising at least one of provider rules for associations between providers and NADs, or constraints on associations between NADs and applications, where the provider rules are for providers providing services via the communication network;

based on the read information, the computer system controlling access of at least one of:
at least one of the NADs to the media,
at least one of the applications to the media, or
at least one of the applications to at least one of the NADs;

running a particular application on a particular one of the NADs; and controlling association of the particular one of the NADs with applications such that the particular one of the NADs is only associated with another application different from the particular application when another application of higher priority than the particular application is to use the particular NAD.

2. The computer-implemented method according to claim 1, where the terminal system comprises a database storing at least a part of the information, and wherein running the particular application on the particular one of the NADs includes executing the particular application on the particular one of the NADs based on the read information describing associations between the NADs, media including voice data and non-voice packet-based data, and applications run on at least one of the computer system or the NADs.

3. The computer-implemented method according to claim 1, where the information comprises a prioritization scheme of associations.

4. The computer-implemented method according to claim 1, where the information comprises Service Level Agreements for the applications.

5. The computer-implemented method according to claim 1, further comprising generating for each of the applications and associated media a list of operable NADs.

6. The computer-implemented method according to claim 5, further comprising:
executing a selected particular application in connection with a first NAD from the list when a second NAD on the list is not available; and
allowing association of the selected particular application with the second NAD and changing the selected particular application to use the second NAD after the second NAD becomes available only when media used in the selected particular application and accessed by the first NAD is not active.

7. The computer-implemented method according to claim 5, further comprising:
running a first application in connection with a first NAD using a first media of the first application;
subsequently running a second application in connection with one or more NADs using one or more second media of the second application; and
re-associating at least one of the first NAD, the first application, or the first media such that the first application at least partly continues running on a second NAD.

8. The computer-implemented method according to claim 7, further comprising the first NAD continuing to run the first application using a second media of the first application.

9. The computer-implemented method according to claim 5, further comprising:
running a first application on a first NAD using a first media; and
subsequently starting using a second media by the first application only on a second NAD that is not already running an application using the second media.

10. The computer-implemented method according to claim 1, wherein the read information further comprises an explicit rule indicating that application data, including the non-voiced data and/or packet-based data, and voice data are associated with different devices.

11. The computer-implemented method according to claim 1, further comprising:
running an application on a first NAD connected to the communication network; and
subsequently changing connection of the communication network to a second NAD and continuing running the application on the second NAD.

12. A terminal system configured for connection to a communication network, comprising:
a computer system configured to control a plurality of network access devices (NADs) as terminal devices configured to operate in connection with applications using media including voice data and non-voice packet-based data;
the computer system configured to control associations between the NADs, the applications, and the media based on information, the information comprising at least one of:
provider rules for associations between providers and NADs for providers providing services via the communication network, or constraints on associations between NADs and applications;
the computing system configured to run a particular application on a particular one of the NADs; and
the computing system configured to control association of the particular one of the NADs with applications such that the particular one of the NADs is only associated with another application different from the particular application when another application of higher priority than the particular application is to use the particular NAD.

13. The terminal system of claim 12, further comprising a database accessible by the computer system, the database configured to store at least part of the information, and the computer system configured to read the at least part of the information from the database.

14. The terminal system of claim 12, where the terminal system is an automotive terminal system installed in a vehicle.

15. The terminal system of claim 12, where the applications are run on the NADs such that an application for processing a first type of media is executed by a different NAD than an application for processing a second type of media.

16. The terminal system of claim 12, where the NADs are coupled with the terminal system, and the constraints are used by the computer system to control usage of the NADs associated with respective applications based on the media of the respective applications and availability of the NADs to execute the respective applications and process the media.

17. A non-transitory computer readable storage medium configured to store a plurality of instructions executable by a computer, the computer readable storage medium comprising:
instructions executable by the computer to enable any of a plurality of network access devices (NADs) as terminal devices to independently communicate over a network;
instructions executable by the computer to read information stored in a database, the information comprising an association of a network access device (NAD) included among the NADs with at least one of an application and a provider type;
instructions to control the NAD to run the application in accordance with constraints included in the information based on at least one of a capability of the NAD to execute the application and process a media type including voice data and non-voice packet-based data used by the application, or a contractual obligation of a provider of network services identified with the provider type;
instructions executable by the computer to run a particular application on a particular one of the NADs; and instructions executable by the computer to control association of the particular one of the NADs with applications such that the particular one of the NADs is only associated with another application different from the particular application when another application of higher priority than the particular application is to use the particular NAD.

18. The non-transitory computer readable storage medium of claim 17, further comprising instructions executable by the computer to prioritize associations between the NADs and at least one of the applications and the provider type.

19. The non-transitory computer readable storage medium of claim 17, where each of the associations is a unique mapping between an individual NAD, a particular application executable by the individual NAD, and media used by the particular application.

20. The non-transitory computer readable storage medium of claim 17, where the instructions to control the NAD further comprise instructions to control connection to the network and use of the network by the NAD to communicate media having the media type used by the application.

\* \* \* \* \*